United States Patent [19]
Karnell

[11] Patent Number: 5,593,491
[45] Date of Patent: Jan. 14, 1997

[54] METHOD OF PREPARING TRIARYLMETHANE DYES AND PIGMENTS

[75] Inventor: Leigh Ann Karnell, Huntington, W. Va.

[73] Assignee: BASF Corporation, Southfield, Mich.

[21] Appl. No.: 362,360

[22] Filed: Dec. 22, 1994

[51] Int. Cl.$^6$ ................................................ C08K 5/16
[52] U.S. Cl. .................................... 106/493; 552/110
[58] Field of Search ............................. 106/493; 552/110

[56] References Cited

U.S. PATENT DOCUMENTS

| | | | |
|---|---|---|---|
| 3,925,094 | 12/1975 | Papenfuss et al. | 106/493 |
| 4,041,054 | 8/1977 | Hahnke et al. | 552/110 |
| 4,062,877 | 12/1977 | Hahnke et al. | 552/110 |
| 4,444,592 | 4/1984 | Ludwig | 106/493 |
| 4,678,613 | 7/1987 | Flores | 552/110 |
| 5,199,985 | 4/1993 | Schneider et al. | 106/493 |
| 5,279,655 | 1/1994 | Takazawa et al. | 106/493 |

*Primary Examiner*—Helene Klemanski
*Attorney, Agent, or Firm*—Paul L. Marshall

[57] ABSTRACT

A method or preparing triarylmethane dyes and pigments is disclosed. An amino-substituted triarylmethane compound is reacted with a primary or secondary aromatic amine in solvent using an acid catalyst until a composition having a desired hue is obtained. This composition is then vacuum distilled to remove the solvent and any unreacted aromatic amine, yielding a molten composition having a temperature of at least 165° C. The molten composition is then cooled under conditions such that a temperature of at least 165° C. is maintained for at least 1 hour. A group IA or group II metal hydroxide is added to the composition after the desired hue has been reached, either before, during, or after the vacuum distillation.

11 Claims, No Drawings

METHOD OF PREPARING TRIARYLMETHANE DYES AND PIGMENTS

FIELD OF THE INVENTION

This invention relates generally to dyes and pigments, and specifically to triarylmethane dyes and pigments and methods for the production thereof.

BACKGROUND OF THE INVENTION

Triarylmethane dyes and pigments are well-known in the art for providing various shades of blue coloration. These materials, such as those of the Spirit Blue family, are used primarily in inks and carbonless copy. The hue of these blue dyes and pigments can range from the violet (i.e., red shades) to blue-green (i.e., blue shades).

Triarylmethane dyes can be manufactured by first reacting a simple amino-substituted triarylmethane compound with an aromatic primary or secondary amine to form the principal chromophore, which is an aromatic amine-substituted triarylmethane. This reaction is usually conducted in solvent in the presence of an acid catalyst. This reaction is allowed to proceed until the reaction product composition has the desired hue, at which time the reaction is subdued. One way of subduing the reaction to achieve the desired hue control is to apply a vacuum to cool the reaction mixture and remove the solvent and any unreacted amine. As most of the solvent is removed, the temperature of the reaction mixture increases back up to the range of where it was before the vacuum was applied. The resulting molten organic glass is then cooled by any of a variety of means, after which it can be formed into solid particles for later use.

Depending on the cooling method used in the final step, the time required for cooling can vary significantly. In some processes, the molten product is cast onto a concrete floor, from where it can be broken up after it cools. In such a process, the cooling time is typically under one hour. Other processes involve cooling by passing the molten material over cooled rollers in a flaker, which can involve cooling times of 6–7 hours, or into drums, which can involve cooling times of 36–48 hours. Faster times (1 hour or less) are possible, but processing to achieve the desired flake characteristics of the finished product becomes more difficult, often requiring the addition of other components to maintain adequate fluidity during cooling.

In processes involving extended cooling times (e.g., ≧1 hour), it has now been discovered that side reactions can continue to occur. These side reactions can produce various yellow, orange, red, and brown colored species of indeterminate structure, which decreases the chroma and the tinctorial strength of the final material. It would thus be desirable to provide a method of manufacturing triarylmethane dyes and pigments of high purity and chroma.

SUMMARY OF THE INVENTION

It has now been found that triarylmethane dyes and pigments of such high purity and chroma can be prepared through the addition of a group IA or group II metal hydroxide to the molten reaction mixture composition before it is subjected to the final cooling step. Thus, according to the present invention, there is provided a method of preparing a triarylmethane dye or pigment comprising the steps of (A) reacting an amino-substituted triarylmethane compound with a primary or secondary aromatic amine in solvent using an acid catalyst until a composition having a desired hue is obtained, (B) vacuum distilling the composition to remove the solvent and any unreacted aromatic amine, whereby a molten composition having a temperature of at least 165° C. is produced, (C) adding a group IA or group II metal hydroxide to the composition before, during, or after step (B), and (D) cooling said molten composition under conditions such that a temperature of at least 165° C. is maintained for at least 1 hour.

Dyes and pigments produced by this process have high levels of purity and good chroma.

DESCRIPTION OF THE PREFERRED EMBODIMENTS

The triarylmethane dyes and pigments are prepared according to the invention by reaction of an amino-substituted triarylmethane compound with a primary or secondary aromatic amine. Any amino-substituted triarylmethane can be used, such as fuchsonimine, Doebner's violet, or pararosaniline. Pararosaniline, having the structure:

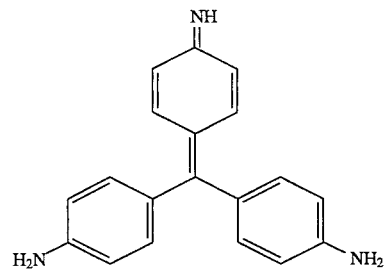

is preferred, as it results in final end products in the Spirit Blue family, which have many desirable properties as dyes and pigments.

A variety of compounds may also be used as the primary or secondary aromatic amine. Such compounds may be characterized by the formula:

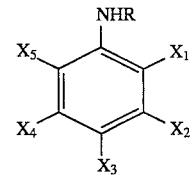

wherein R is H, alkyl of 1–6 carbon atoms and and $X_1$, $X_2$, $X_3$, $X_4$, and $X_5$ are each independently H, alkyl, or halogen. Examples of useful primary or secondary aromatic amines include aniline, o-toluidine, m-toluidine, sulfanilic acid, diphenylamine, N-methylaniline, N-ethylaniline, etc., with aniline, o-toluidine, and m-toluidine being the most preferred.

The reaction between the amino-substituted triarylmethane and the primary or secondary aromatic amine is conducted in solvent in the presence of an acid catalyst. The solvent may take part in the reaction. Useful solvents include aromatic amines such as aniline, N-methylpyrrolidone, o-toluidine, m-toluidine, and the like. Useful acid catalysts are typically organic acid catalysts, such as benzoic acid, acetic acid, or naphthenic acid. Other acids capable of donating a proton, such as inorganic acids (e.g., sulfonic acid, hydrochloric acid) can be used as well. The catalyst is typically present at levels of 1–10% of the reaction mixture.

The reaction between the amino-substituted triarylmethane and the primary or secondary aromatic amine takes place at temperatures ranging from 150°–200° C. The reaction is allowed to run until the desired hue is reached. This typically ranges from from about 30 minutes (violet blue) to 5 hours (green-shade blue).

When the desired hue is reached, the reaction is subdued by quickly cooling the mixture. This is accomplished by applying vacuum to remove the solvent and any unreacted aromatic amine. Near the end of this distillation step, the temperature of the mixture rises back up into the reaction temperature range, usually to at least 165° C., yielding a molten composition.

This molten composition is then discharged from the reactor, and isolated and cooled by any of a variety of methods. In accordance with the present invention, the cooling is accomplished under conditions such that the reaction composition maintains a temperature of at least 165° C. for at least one hour. Preferably, the temperature is maintained above 175° C. to achieve the desired flaking performance. Isolation/cooling methods useful in the practice of the invention include casting into drums or other containers, and flaking.

According to the present invention, a group IA or II metal hydroxide is added to the reaction mixture some time after the desired hue is reached and prior to the final cooling step. The addition of the metal hydroxide may take place prior to, during, or after the vacuum distillation step. Preferably, the metal hydroxide is added prior to vacuum distillation to minimize the formation of any undesired products by side reactions. Any of the well-known metal hydroxides, such as sodium hydroxide, lithium hydroxide, potassium hydroxide, cesium hydroxide, rubidium hydroxide, magnesium hydroxide, or calcium hydroxide, may be used. In a preferred embodiment, the metal hydroxide is a group IA metal hydroxide, most preferably sodium hydroxide. In addition to reducing the formation of contaminants through side reactions, sodium hydroxide also suppresses suppression of the colorless leuco form of the dye/pigment, resulting in higher tintorial strength of the finished product.

The invention is further described in the following Examples.

All of the reactions were carried out in a apparatus of the following type: a three necked, one liter Pyrex glass flask was fitted with a paddle type agitator equipped with a vacuum service bushing standard taper joint; a resistance thermal device (RTD) temperature sensor attached to a controller which was used to control the heating mantle; and the third neck on the flask was fitted with a condenser and receiving flask fitted with a vacuum attachment which was connected to a liquid nitrogen cooled vapor trap and a vacuum pump.

EXAMPLE NUMBER 1: CONTROL REACTION RUN WITH ACETIC ACID TO PRODUCE A RED SHADE SPIRIT BLUE—NO ALKALI METAL HYDROXIDE USED

The flask was charged with 500 grams of an 18.6% solution of pararosaniline base (CI Basic Red 15) (0.305 g mole) in aniline. This solution was heated to 130° C. and 5.9 grams of acetic acid (0.098 g mole) was added to the reaction mass. The reaction mass was then heated to 175°–185° C. and held for 50 minutes until the correct hue and chemical composition was reached (for a red shade type of Spirit Blue); the reaction vessel was then place under vacuum (around 20 torr) and the excess aniline was distilled off via the condenser. The reaction mass was then held at 175° C. for six hours. The initial chroma and hue of the blue dye in the reaction mass (Opal Blue; Solvent Blue 23) was dC=+2.33, dH=−0.04. The final chroma and hue at the end of the six hour period was dC=−2.99 dH=−2.29. These results are summarized in Table I.

EXAMPLE NUMBER 2: CONTROL REACTION RUN WITH BENZOIC ACID TO PRODUCE A RED SHADE SPIRIT BLUE (SOLVENT BLUE 23)—NO ALKALI METAL HYDROXIDE USED

The flask was charged with 500 grams of an 18.6% solution of pararosaniline base (CI Basic Red 15) (0.305 g mole) in aniline. This solution was heated to 130° C. and 2.8 grams of benzoic acid (0.023 g mole) was added to the reaction mass. The reaction mass was then heated to 175°–185° C. and held for 38 minutes until the correct hue and chemical composition was reached (for a red shade type of Spirit Blue); the reaction vessel was then placed under vacuum (around 20 torr) and the excess aniline was distilled off via the condenser. The reaction mass was then held at 165° C. for six hours. The initial chroma and hue of the blue dye in the reaction mass (Opal Blue; Solvent Blue 23) was dC=+2.06, dH=+0.83. The final chroma and hue at the end of the six hour period was dC=−6.03, dH=−5.65. These results are summarized in Table I.

EXAMPLE NUMBER 3: EXPERIMENTAL RUN DONE WITH ACETIC ACID AND QUENCHED WITH SODIUM HYDROXIDE

The flask was charged with 500 grams of an 18.6% solution of pararosaniline base (CI Basic Red 15) (0.305 g mole) in aniline. This solution was heated to 130° C. and 5.6 grams of acetic acid (0.093 g mole) was added to the reaction mass. The reaction mass was then heated to 175°–185° C. and held for 50 minutes until the correct hue and chemical composition was reached (for a red shade type of Spirit Blue). At this point 10.0 grams of 50% aqueous sodium hydroxide (PPG Chemical) (0.12 g moles) was added to the flask. The reaction vessel was then placed under vacuum (around 20 torr) and the excess aniline was distilled off via the condenser. The reaction mass was then held at 175° C. for six hours. The initial chroma and hue of the blue dye in the reaction mass (Opal Blue; Solvent Blue 23) was dC=+2.66, dH=+0.53. The final chroma and hue at the end of the six hour period was dC=+1.81 dH=−0.81. These results are summarized in Table I.

EXAMPLE NUMBER 4: EXPERIMENTAL RUN DONE WITH BENZOIC ACID AND QUENCHED WITH AQUEOUS SODIUM HYDROXIDE

The flask was charged with 500 grams of an 18.6% solution of pararosaniline base (CI Basic Red 15) (0.305 g mole) in aniline. This solution was heated to 130° C. and 2.8 grams of benzoic acid (0.023 g mole) was added to the reaction mass. The reaction mass was then heated to 175°–185° C. and held for 50 minutes until the correct hue and chemical composition was reached (for a red shade type of Spirit Blue). The reaction vessel was then placed under vacuum (around 20 torr) and the excess aniline was distilled off via the condenser. At this point 10.0 grams of 50% aqueous sodium hydroxide (PPG Chemical) (0.12 g moles)

was added to the flask. The reaction mass was then held at 175° C. for hours. The initial chroma and hue of the blue dye in the reaction mass (Opal Blue; Solvent Blue 23) was dC=+0.33, dH=+0.88. The final chroma and hue at the end of the six hour period was dC=−0.70 dH=+0.66. These results are summarized in Table I.

EXAMPLE NUMBER 5: EXPERIMENTAL RUN DONE WITH BENZOIC ACID AND QUENCHED WITH A GREATER AMOUNT OF SODIUM HYDROXIDE (A TWO FOLD EXCESS)

The flask was charged with 500 grams of an 18.6% solution of pararosaniline base (CI Basic Red 15) (0.305 g mole) in aniline. This solution was heated to 130° C. and 5.6 grams of banzoic acid (0.023 g mole) was added to the reaction mass. The reaction mass was then heated to 175°–185° C. and held for 50 minutes until the correct hue and chemical composition was reached (for a red shade type of Spirit Blue). At this point 20.0 grams of 50% aqueous sodium hydroxide (PPG Chemical) (0.24 g moles) was added to the flask. The reaction vessel was then placed under vacuum (around 20 torr) and the excess aniline was distilled off via the condenser. The reaction mass was then held at 175° C. for six hours. The initial chroma and hue of the blue dye in the reaction mass (Opal Blue; Solvent Blue 23) was dC=+1.80, dH=−0.70. The final chroma and hue at the end of the six hour period was dC=+1.29 dH=−0.73. There results are summarized in Table I.

EXAMPLE NUMBER 6: EXPERIMENTAL RUN DONE WITH ACETIC ACID AND QUENCHED WITH AQUEOUS POTASSIUM HYDROXIDE

The flask was charged with 500 grams of an 18.6% solution of pararosaniline base (CI Basic Red 15) (0.305 g mole) in aniline. This solution was heated to 130° C. and 5.6 grams of acetic acid (0.093 g mole) was added to the reaction mass. The reaction mass was then heated to 175°–185° C. and held for 50 minutes until the correct hue and chemical composition was reached (for a red shade type of Spirit Blue). At this point 14.0 grams of 50% aqueous potassium hydroxide (VWR Chemical) (0.12 g moles) was added to the flask. The reaction vessel was then placed under vacuum (around 20 torr) and the excess aniline was distilled off via the condenser. The reaction mass was then held at 175° C. for six hours. The initial chroma and hue of the blue dye in the reaction mass (Opal Blue; Solvent Blue 23) was dC=+1.26, dH=+0.46. The final chroma and hue at the end of the six hour period was dC=−0.25 dH=−0.08 There results are summarized in Table I.

EXAMPLE NUMBER 7: EXPERIMENTAL RUN DONE WITH ACETIC ACID AND QUENCHED WITH SODIUM HYDROXIDE

The flask was charged with 500 grams of an 18.6% solution of pararosaniline base (CI Basic Red 15) (0.305 g mole) in aniline. This solution was heated to 130° C. and 5.6 grams of acetic acid (0.093 g mole) was added to the reaction mass. The reaction mass was then heated to 175°–185° C. and held for 50 minutes until the correct hue and chemical composition was reached (for a red shade type of Spirit Blue). At this point 5.0 grams of 100% pelletized ground, sodium hydroxide (VWR) (0.12 g moles) was added to the flask. The reaction vessel was then placed under vacuum (around 20 torr) and the excess aniline was distilled off via the condenser. The reaction mass was then held at 175° C. for six hours. The initial chroma and hue of the blue dye in the reaction mass (Opal Blue; Solvent Blue 23) was dC=+1.47, dH=−0.15. The final chroma and hue at the end of the six hour period was dC=+0.61 dH=−0.04 There results are summarized in Table I.

EXAMPLE NUMBER 8: EXPERIMENTAL RUN USING ACETIC ACID AND QUENCHED WITH LITHIUM HYDROXIDE SLURRY

The flask was charged with 500 grams of an 18.6% solution of pararosaniline base (CI Basic Red 15) (0.305 g mole) in aniline. This solution was heated to 130° C. and 5.6 grams of acetic acid (0.093 g mole) was added to the reaction mass. The reaction mass was then heated to 175°–185° C. and held for 50 minutes until the correct hue and chemical composition was reached (for a red shade type of Spirit Blue). At this point 524 grams of Lithium hydroxide in 10 ml of distilled water (J. T. Baker) (0.125 g moles) was added to flask. The reaction vessel was then placed under vacuum (around 20 torr) and the excess aniline was distilled off via the condenser. The lithium reacted violently with the reaction mass causing splattering. The reaction mass was then held at 175° C. for six hours. The initial chroma and hue of the blue dye in the reaction mass (Opal Blue; Solvent Blue 23) was dC=+1.69, dH=+1.50. The final chroma and hue at the end of the six hour period was dC=−2.87 dH=−1.01 There results are summarized in Table I.

EXAMPLE NUMBER 9: EXPERIMENTAL RUN USING ACETIC ACID AND QUENCHED WITH CALCIUM HYDROXIDE SLURRY

The flask was charged with 500 grams of an 18.6% solution of pararosaniline base (CI Basic Red 15) (0.305 g mole) in aniline. This solution was heated to 130° C. and 5.6 grams of acetic acid (0.093 g mole) was added to the reaction mass. The reaction mass was then heated to 175°–185° C. and held for 50 minutes until the correct hue and chemical composition was reached (for a red shade type of Spirit Blue). At this point 9.26 grams of Calcium hydroxide in 20 ml of distilled water (J. T. Baker) (0.125 g moles) was added to flask. The reaction vessel was then placed under vacuum (around 20 torr) and the excess aniline was distilled off via the condenser. The reaction mass was then held at 175° C. for six hours. The initial chroma and hue of the blue dye in the reaction mass (Opal Blue; Solvent Blue 23) was dC=+1.72, dH=+3.21. The final chroma and hue at the end of the six hour period was dC=−7.33 dH=−1.62. There results are summarized in Table I.

EXAMPLE NUMBER 10: EXPERIMENTAL RUN USING ACETIC ACID AND QUENCHED WITH SODIUM CARBONATE SOLUTION

The flask was charged with 500 grams of an 18.6% solution of pararosaniline base (CI Basic Red 15) (0.305 g mole) in aniline. This solution was heated to 130° C. and 5.6 grams of acetic acid (0.093 g mole) was added to the reaction mass. The reaction mass was then heated to 175°–185° C. and held for 50 minutes until the correct hue and chemical composition was reached (for a red shade type of Spirit Blue). At this point 13.24 grams of Sodium carbonate as the dry powder (J. T. Baker) (0.125 g moles) was added to flask. The reaction vessel was then placed under vacuum (around 20 torr) and the excess aniline was distilled off via the condenser. The reaction mass was then held at 175° C. for six hours. The initial chroma and hue of the blue dye in the reaction mass (Opal Blue; Solvent Blue 23) was dC=+1.78, dH=+1.60. The final chroma and hue at the end of the six-hour period was dC=−4.47, dH=−1.28. These results are summarized in Table I.

| RUN # | LAB # | PHENYLA-TION CATALYST | ALKALINE/ ALKALI METAL SALT | FORM | INITIAL HUE | INITIAL CHROMA | INITIAL LEUCO DYE FORM | FINAL HUE | FINAL CHROMA | FINAL LEUCO DYE FORM |
|---|---|---|---|---|---|---|---|---|---|---|
| \multicolumn{11}{c}{Experimental Results From Phenylation Experiments — Use of Alkali Metal Hydroxides to Suppress Unwanted Side-Reactions} | | | | | | | | | | |
| \multicolumn{11}{c}{METAL SALTS ADDED PRIOR TO VACUUM DISTILLATION:} | | | | | | | | | | |
| 1 | 13 | ACETIC | CONTROL | — | 0.04 | 2.33 | 0.9 | −2.29 | −2.99 | 7.5 |
|   | 26 | "      |         |   | 0.96 | 2.21 | 0.9 | −1.35 | −3.05 | 9.9 |
|   | 39 | "      |         |   |      |      | 0.0 |       |       | 9.3 |
| 2 | 23 | BENZOIC | CONTROL | — | −0.83 | 2.06 | 0.1 | −5.65 | −6.03 | 16.6 |
| 3 | 28 | ACETIC | SODIUM HYDROXIDE | SOLUTION | −0.53 | 2.66 | 0.7 | −0.81 | 1.81 | 2.8 |
| 4 | 29 | BENZOIC | SODIUM HYDROXIDE | SOLUTION | 0.88 | 0.33 | 3.2 | 0.66 | −0.70 | 5.3 |
| 5 | 31 | BENZOIC | SODIUM HYDROXIDE 2X | SOLUTION | −0.70 | 1.80 | 0.5 | −0.73 | 1.29 | 3.9 |
| 6 | 34 | ACETIC | POTASSIUM HYDROXIDE | SOLUTION | 0.46 | 1.26 | 1.5 | 0.08 | −0.25 | 11.2 |
| 7 | 36 | ACETIC | SODIUM HYDROXIDE | POWDER | −0.15 | 1.47 | 0.5 | −0.40 | 0.61 | 2.5 |
| 8 | 38 | ACETIC | LITHIUM HYDROXIDE | SLURRY | 1.50 | 1.69 | 0.7 | −1.01 | −2.87 | 6.6 |
| 9 | 41 | ACETIC | CALCIUM HYDROXIDE | SLURRY | 3.21 | 1.72 | 0.3 | −1.62 | −7.33 | 10.1 |
| 10 | 32 | ACETIC | SODIUM CARBONATE | POWDER | 1.60 | 1.78 | 0.5 | −1.28 | −4.47 | 7.6 |
| \multicolumn{11}{c}{METAL SALTS ADDED AFTER VACUUM DISTILLATION:} | | | | | | | | | | |
| 1 | 24 | ACETIC | SODIUM HYDROXIDE | SOLUTION | 0.31 | 2.11 | 0.3 | −0.04 | −0.55 | 6.2 |
| 2 | 25 | ACETIC | SODIUM HYDROXIDE 2X | SOLUTION | 0.96 | 1.77 | 0.3 | 0.53 | −0.13 | 5.6 |
| 3 | 27 | BENZOIC | SODIUM HYDROXIDE | SOLUTION | −1.33 | 2.29 | 1.6 | −1.49 | 0.45 | 8.0 |

What is claimed is:

1. A method of preparing a triarylmethane dye or pigment comprising the steps of
   (A) reacting an amino-substituted triarylmethane compound with a primary or secondary aromatic amine in solvent using an acid catalyst until a composition having a desired hue is obtained,
   (B) vacuum distilling the composition to remove the solvent and any unreacted aromatic amine, whereby a molten composition having a temperature of at least 165° C. is produced,
   (C) adding a group IA or group II metal hydroxide to the composition before, during, or after step (B), and
   (D) cooling said molten composition under conditions such that a temperature of at least 165° C. is maintained for at least 1 hour.

2. A method according to step (1) wherein the conditions of step (D) are such that a temperature of at least 175° C. is maintained for at least 1 hour.

3. A method according to claim 1 wherein the amino-substituted triarylmethane compound of step (A) has the formula:

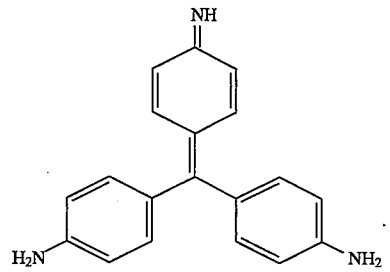

4. A method according to claim 1 wherein the primary or secondary aromatic amine has the formula:

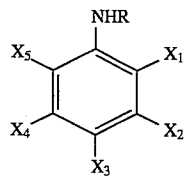

wherein R is H, alkyl of 1–6 carbon atoms and $X_1$, $X_2$, $X_3$, $X_4$, and $X_5$ are each independently H, alkyl or halogen.

5. A method according to claim 1 wherein the reaction product of step (A) comprises one or more compounds according to the formula:

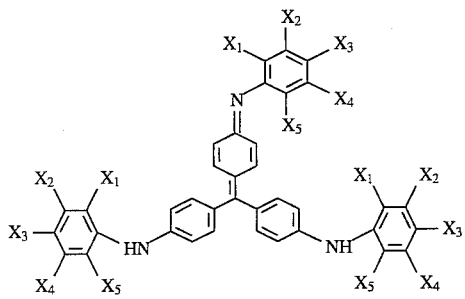

wherein and $X_1$, $X_2$, $X_3$, $X_4$, and $X_5$ are each independently H, alkyl, or halogen.

6. A method according to claim 1 wherein the metal hydroxide is a group IA metal hydroxide.

7. A method according to claim 1 wherein the metal hydroxide is a group II metal hydroxide.

8. A method according to claim 1 wherein the acid catalyst is acetic acid.

9. A method according to claim 1 wherein the acid catalyst is benzoic acid.

10. A method according to claim 1 wherein the conditions of step (D) are such that a temperature of at least 165° C. is maintained for at least 2 hours.

11. A method according to claim 1 wherein the cooling in step (D) is performed by casting the molten composition into a drum or other container.

* * * * *